Patented Mar. 14, 1939

2,150,827

UNITED STATES PATENT OFFICE 2,150,827

PROCESS FOR PRESERVING CEREALS AND THE LIKE

Aquiles Argentino Ginaca, Buenos Aires, Argentina

No Drawing. Application January 11, 1935, Serial No. 1,434. Renewed January 23, 1939. In Argentina December 6, 1934

1 Claim. (Cl. 99—153)

The present invention relates to a new industrial gaseous product to protect cereals, seeds and general articles against the destructive action of parasites, insects and corroding worms.

This industrial product used for the conservation of cereals and seeds, remains active for conserving the cereals for several years and keeping them free of insects, especially of moths and weevils; and retaining them in an excellent condition for their germination.

In tests made the efficacy of this new preservative has been verified and the articles subjected to the action of said preservatives have not lost any one of their particular characteristics.

This product consists of the following elements and herein given proportions, the latter varying according to the degree of moisture of the articles to be treated and the nature of the same.

| | Per cent |
|---|---|
| Oxygen, from | 1 to 10 |
| Hydrogen, from | 1 to 5 |
| Carbonic gas | 98 to 85 |

These gases are mixed in suitable recipients and passed through cotton filters or other appropriate filters before being applied to the articles to be treated.

The product thus obtained is introduced in the closed or semi-closed premises where the articles to be treated are thus saturated the gaseous product being introduced in a rational manner, preferably by means of pipes with appropriate openings in such a manner that the gas will be distributed uniformly, displacing at the same time the surrounding air which accompanies the articles to be treated.

If in the closed or semi-closed premises there be any loss of the gaseous product, this should be replaced in order to maintain the treated articles within the referred gaseous product.

This gaseous product may also be employed in the holds of ships or in wagons, granaries and in waterproofed boxes or bags, for instance, like those of the type used to barrel Portland cement.

I claim:

A process for preserving materials such as cereal and the like, comprising the steps of placing the material to be treated in a storage chamber, uniformly distributing a gaseous mixture throughout the material so as to displace any air present, said gaseous mixture consisting of 1 to 10% oxygen, 1 to 5% hydrogen, and 98 to 85% carbonic gas, and maintaining the gaseous mixture in the chamber during the period of storage.

AQUILES ARGENTINO GINACA.